US011838427B2

(12) United States Patent
Bansal et al.

(10) Patent No.: US 11,838,427 B2
(45) Date of Patent: Dec. 5, 2023

(54) USAGE RESTRICTIONS FOR DIGITAL CERTIFICATES

(71) Applicant: International Business Machines Corporation, Armonk, NY (US)

(72) Inventors: Rinkesh I. Bansal, Pune (IN); Vinod A. Valecha, Pune (IN); Sanjay B. Panchal, Mumbai (IN); Chintan Thaker, Pune (IN)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 17/167,378

(22) Filed: Feb. 4, 2021

(65) Prior Publication Data

US 2022/0247575 A1  Aug. 4, 2022

(51) Int. Cl.
*H04L 9/32* (2006.01)
*G06F 21/57* (2013.01)
*G06N 5/04* (2023.01)
*G06N 20/00* (2019.01)

(52) U.S. Cl.
CPC ............ *H04L 9/3263* (2013.01); *G06F 21/57* (2013.01); *G06N 5/04* (2013.01); *G06N 20/00* (2019.01); *G06F 2221/034* (2013.01); *G06F 2221/2137* (2013.01)

(58) Field of Classification Search
None
See application file for complete search history.

(56) References Cited

U.S. PATENT DOCUMENTS

| 7,984,479 | B2 | 7/2011 | Brabson | |
|---|---|---|---|---|
| 10,439,826 | B2 | 10/2019 | Grajek | |
| 2015/0271157 | A1 | 9/2015 | Ronca | |
| 2016/0142211 | A1* | 5/2016 | Metke | H04L 9/3268 713/175 |
| 2018/0167222 | A1 | 6/2018 | Grajek | |
| 2019/0028466 | A1 | 1/2019 | Falk | |
| 2020/0028699 | A1 | 1/2020 | Sharifi Mehr | |

(Continued)

FOREIGN PATENT DOCUMENTS

CN          101411159 A     4/2009

OTHER PUBLICATIONS

S. Chokani et al., "Internet X.509 Public Key Infrastructure Certificate Policy and Certification Practices Framework (RFC3647)," IPCOM000020226D, IP.com, Nov. 1, 2003.

(Continued)

*Primary Examiner* — William J. Goodchild
(74) *Attorney, Agent, or Firm* — Stosch Sabo

(57) ABSTRACT

A method, a computer program product, and a system for usage restrictions on digital certificates. The method includes selecting a digital certificate relating to a user and determining a usage restriction policy for the digital certificate based on the user. The method also includes populating an extension field of the digital certificate with the usage restriction policy. The method further includes providing the digital certificate including the usage restriction policy to the user. The method also includes gathering parameters relating to the digital certificate, determining usage patterns based on the parameters, inputting the usage patterns into a machine learning model, outputting a risk assessment, and updating the usage restriction policy based on the risk assessment.

20 Claims, 7 Drawing Sheets

(56) References Cited

U.S. PATENT DOCUMENTS

2020/0052911 A1* 2/2020 Popoveniuc .......... H04L 9/3268
2020/0192575 A1   6/2020 Tan

OTHER PUBLICATIONS

S. Chokhani et al., "Internet X.509 Public Key Infrastructure Certificate Policy and Certification Practices Framework (RFC2527)," IP.com, PCOM000003112D, Mar. 1, 1999.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

USAGE RESTRICTIONS FOR DIGITAL CERTIFICATES

BACKGROUND

The present disclosure relates to digital certificates, and more specifically, to usage restrictions for digital certificates.

Digital certificates, or public key certificates, are electronic documents used to prove the ownership of a public key. The certificates include information about the key, the identity of its owner, and the digital signature of an entity that has verified the certificate's contents. If the digital signature is valid, and the software examining the certificate trusts the issuer, then the key provided by the digital certificate can be used to communicate securely with the owner of the certificate.

An insider threat is a type of cybersecurity attack that includes sabotage, espionage, fraud, and competitive advantage that is often carried out by abusing access rights, theft of materials, and mishandling physical devices. Threats can also result from employee carelessness or policy violation that allow system access to malicious outsiders. Insider threats can be carried out through the use of valid digital certificates allowing an attacker to abuse their access rights.

SUMMARY

Embodiments of the present disclosure include a computer-implemented method for usage restrictions on digital certificates. The computer-implemented method includes selecting a digital certificate relating to a user and determining a usage restriction policy for the digital certificate based on the user. The usage restriction policy applies restrictions during a validity period of the digital certificate. The computer-implemented method also includes populating an extension field of the digital certificate with the usage restriction policy. The computer-implemented method further includes providing the digital certificate including the usage restriction policy to the user. The computer-implemented method also includes gathering parameters relating to the digital certificate, determining usage patterns based on the parameters, inputting the usage patterns into a machine learning model, and outputting, by the machine learning model, a risk assessment for the digital certificate. The computer-implemented method further includes updating the usage restriction policy based on the risk assessment.

Additional embodiments of the present disclosure include a computer program product for usage restrictions on digital certificates, which can include one or more computer-readable storage medium, and program instructions stored on the one or more computer-readable storage media, the program instruction executable by a processor to cause the processor to perform a method, the program instructions include program instruction to select a digital certificate relating to a user and determine a usage restriction policy for the digital certificate based on the user. The usage restriction policy applies restrictions during a validity period of the digital certificate. The program instructions also include program instructions to populate an extension field of the digital certificate with the usage restriction policy. The program instructions further include program instructions to provide the digital certificate, including the usage restriction policy to the user. The program instructions also include program instructions to gather parameters relating to the certificate, determine usage patterns based on the parameters, input the usage patterns into a machine learning model, and output, by the machine learning model, a risk assessment for the digital certificate. The program instructions also include program instructions to update the usage restriction policy based on the risk assessment.

Further embodiments are directed to a system for usage restrictions on digital certificates and configured to perform the methods described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
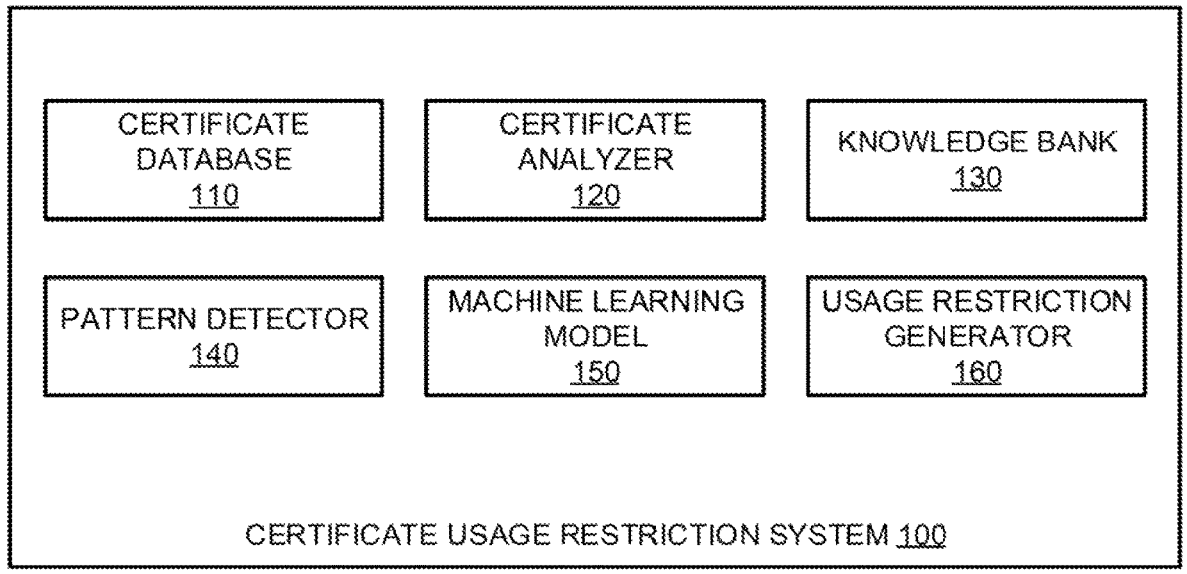
FIG. 1 is a block diagram illustrating a certificate usage restriction system, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to digital certificates, and more specifically, to usage restrictions for digital certificates. While the present disclosure is not necessarily limited to such applications, various aspects of the disclosure may be appreciated through a discussion of various examples using this context.

A digital certificate is an electronic document that provides information proving the identity of an entity. The certificate binds the identity of the entity to a public key owned by the entity. A certificate can include standard information such as a name, a public key, a validity period, and a digital signature of a certification authority.

A certification authority can be a trusted third party that issues certificates to entities after verifying the entity's identity. Once verified, the certificate authority signs the certificate using its own private key, and the certificate is provided to the entity. Another entity can then validate the identity of a certificate owner by obtaining their digital certificate and verifying the signature using the certificate authority's public key.

Digital certificates are used by cryptographic technologies as a way to authenticate a source and protect the confidentiality and integrity of information communicated and stored. Cryptographic technologies include various protocols, schemes, and infrastructures that rely on a collection of cryptographic algorithms to maintain security. The cryptographic algorithms transform data, using a variable, or key, to encrypt and protect information typically in the form of symmetric and asymmetric algorithms.

In symmetric cryptographic algorithms, the same key is used by both the originator and recipient of encrypted information. A symmetric key remains a secret to maintain confidentiality as anyone with the key can recover the encrypted information. Asymmetric cryptographic algorithms require the originator to use one key and the recipient to use a different but related key. The private key remains secret, while the public key can be made public without degrading the security of the cryptographic process.

During the cryptographic process, digital certificates act as electronic credentials that bind the identity of the certificate owner to a pair of public and private keys that can be used to encrypt and sign information. Without a certificate, someone could encrypt data with a private key, and a corresponding public key could be used to decrypt the data. However, there would be no assurance that the data originated from a particular person. To ensure certificate authenticity, certificate authorities are used. Certificate authorities act as trusted third parties that issue digital certificates. Certificates from certificate authorities bind the identity of a certificate owner to a pair of encryption keys while also providing assurances to receiving parties of the authenticity of the certificate owner.

Limitations on certificate security remain, however, as certificates can be used nefariously to gain access to a system. The majority of cyberattacks occur from insider threats. These attackers use valid digital certificates to prove their identity to gain access to a system, thereby abusing their access rights. Currently, the only additional protection digital certificates offer comes in the form of certification expiration. For example, organizations can create digital certificates with validity periods of a month, a year, or several years. As such, there is a need for additional protection against the misuse of digital certificates.

An insider threat is a type of cybersecurity attack that includes sabotage, espionage, fraud, and competitive advantage that is often carried out through abusing access rights, theft of materials, and mishandling physical devices. Threats can also result from employee carelessness or policy violation that allow system access to malicious outsiders. Insider threats can be carried out through the use of valid digital certificates allowing an attacker to abuse their access rights.

Embodiments of the present disclosure may overcome the above and other problems by using a certificate usage restriction system for providing a usage restriction mechanism within a digital certificate. The usage restriction mechanism can provide protection against certificate misuse by storing specific times and days when a digital certificate is considered valid during its validation period. The specific times can be stored in custom fields that store the specific times and days in which the digital certificate is allowed to be used. For example, a digital certificate can have a validation period of two years starting Jan. 1, 2020, thru Dec. 31, 2021, but also a usage restriction that restricts the digital certificate to weekday usage only.

More specifically, the certificate usage restriction system applies usage restrictions to digital certificates in addition to their issued validity periods. The usage restrictions can be in the form of a usage restriction policy that is applied to an extension of a digital certificate. The usage restriction policy can also vary based on the user that owns the digital certificate. The usage restriction policy can be, for example, a specific time period, specific days, and restricted to specific entities for when the digital certificate is valid, as well as any combination thereof. Also, the usage restriction policy can apply restrictions on a per-entity basis. For example, the usage restriction policy may restrict a digital certificate to weekday usage only for entity A while restricting the digital certificate to Monday usage only for entity B.

In some embodiments, the certificate usage restriction system ranks a digital certificate to determine whether its usage restriction policy requires adjustment. Parameters relating to the usage of the digital certificate can be gathered. Based on those parameters, usage patterns can be determined. These usage patterns can indicate a typical usage of a user using the digital certificate as well any potential misuse of the digital certificate. A ranking can be performed on the digital certificate to determine whether it exceeds a rank threshold. If so, then an additional analysis and ranking of the usage restriction policy can be performed. Each usage restriction within the policy can be analyzed and then updated to prevent any potential misuse of the digital certificate.

In some embodiments, the certificate usage restriction system includes a machine learning model for determining a risk assessment of the digital certificate. Parameters relating to the usage of the digital certificate can be gathered. Based on those parameters, usage patterns can be determined. The usage patterns can be inputted into the machine learning model to determine a risk assessment of the digital certificate. The risk assessment can be a scale indicating the likelihood of misuse of the digital certificate. If the risk assessment exceeds a risk threshold, then the usage restriction policy can be updated to minimize the risk and lower the risk assessment.

In some embodiments, the certificate usage restriction system includes providing indicators in an extension of the digital certificate when a usage restriction is violated. The certificate usage restriction system can detect when a violation of the usage restriction policy occurs and then record the violation in another extension field of the digital certificate. This allows third-party monitors to evaluate the digital certificate and potentially exclude its use if violations have been indicated.

In some embodiments, the certificate usage system can receive a new usage restriction policy from an entity that relates that entity. For example, entity A provides a usage restriction policy that prohibits the usage of digital certificates to only on weekdays. Entity A can provide the usage restriction and the certificate usage system can populate a second extension field of the digital certificate with the new usage restriction policy. Both policies of the digital certificate can work in tandem.

Referring now to FIG. 1, shown is a high-level block diagram of a certificate usage restriction system 100 for usage restrictions on digital certificates, in accordance with embodiments of the present disclosure. The certificate usage restriction system 100 includes a certificate database 110, a certificate analyzer 120, a knowledge bank 130, a pattern detector 140, a machine learning model 150, and a usage restriction generator 160.

The certificate database 110 is a component of the certificate usage restriction system 100 configured to store digital certificates for usage restriction. Additionally, the certificate database 110 can store information collected, gathered, and generated by the certificate usage restriction system 100. In some embodiments, the stored information includes certificate chains with multiple interrelated certificates. For example, a certificate chain can include a root certificate, an intermediate certificate, and an end certificate. While shown in FIG. 1 as a database, the certificate database 110 can be a mapping, a table, journal, metadata, and the like.

A digital certificate, as used herein, is an electronic document that provides information proving an identity of an entity. A digital certificate contains a public key of the entity bound to the document. Digital certificates are typically structured using the X.509 standard. Within this standard are information fields that are either mandatory or optional. These information fields include, for example, a serial number, a signature algorithm, an issuer name, a validity period, a subject name, public key information, a version, an issuer unique identification, a unique subject identification, and extensions.

Regarding the information fields, the serial number can be represented as a unique positive number assigned to a certificate. The serial number is assigned by the issuer, or certificate authority, to identify the certificate. The signature algorithm field indicates the algorithm used by the issuer to sign the certificate. The issuer field indicates the X.500 distinguished name of the trusted third party who signed and issued the certificate. The validity field indicates the date from when the certificate is valid and the date until when the certificate is valid. The subject includes the distinguished name of the entity that owns the certificate. The owner can be the entity associated with the public key in the certificate. Owners include, for example, a certificate authority, registration authority, a person, a company, or an application. The public key information field contains the public key of the subject and the algorithm identifier. The issuer's unique identification field facilitates the reuse of the issuers' name over time. The extension fields are used to provide additional information about a certificate not provided in the other information field. The other information includes, for example, key usage, alternative subject name, basic constraints, alternative serial number (e.g., bound serial number), policy constraints, and the like.

A certificate can be issued for various purposes, which define the primary use of the certificate. These purposes include encryption, signature, signature and encryption, and signature and smartcard logon. A certificate with encryption purposes contains cryptographic keys for encryption and decryption. A certificate with a signature purpose contains keys for signing data only. The signature and encryption purpose covers all primary uses of a certificate's cryptographic key, including encryption of data, initial logon, or digitally signing data. Signature and smartcard logon purpose allows for initial logon with a smart card and digitally signing data.

Typically, a certificate authority generates a certificate in a standard format (e.g., X.509 certificate standard). The certificate contains the identity of the owner and its public key. The certificate is signed by the certificate authority with its own private key, and the certificate is issued to the owner. A certificate authority can be viewed as a root of trust in a public key infrastructure. When a hierarchical architecture of a certificate is followed, there is a root certificate authority with its own digital certificate, which is self-signed. The root certificate authority can create a certificate chain, or chain of trust, by signing certificates of the subordinate certificate authorities. This means that the certificate issued by a subordinate certificate authority (e.g., policy/intermediate certificate authority, end certificate authority) is considered trusted by the root certificate authority. Thus, a user or a web browser can trust a certificate issued by a subordinate certificate authority if it trusts the root certificate authority. A certificate chain can simplify key management and certificate monitoring by grouping certificate authorities into a tree-like structure, where verifying the root certificate automatically verifies the certificate chain.

The certificate analyzer 120 is a component of the certificate usage restriction system 100 configured to analyze digital certificates. The certificate analyzer 120 can analyze a digital certificate and gather parameters based on the usage of the certificate by a user. For example, the certificate analyzer 120 can monitor a digital certificate to determine when the digital certificate, where it originated from, and by the type of system used by the user. Parameters include, for example, times when used, a region where the digital certificate originated from (e.g., which server), a destination of the digital certificate (e.g., a client), the system used by the user to access the digital certificate, (e.g., Android mobile device, iOS mobile device, Linux, Windows, Mac, etc.), an application used by the user to access the digital certificate (e.g., browser, specific application, etc.). Once the parameters are obtained, the certificate analyzer can store those parameters in the knowledge bank 130.

The certificate analyzer 120 is further configured to determine a ranking of a digital certificate's usage restrictions. For example, the ranking can evaluate the parameters gathered and their given weight to determine a ranking for a digital certificate's usage restriction policy. In some embodiments, the certificate analyzer 120 employs a rank function to determine the ranking of a digital certificate's usage restriction policy as described by Equation 1 defined below:

$$R(L_i) = \frac{\sum_{i=1}^{n} V(p) * W(p)}{n} \qquad \text{Equation 1}$$

Where R represents the rank function and $L_i$ represents a digital certificate for which a ranking is to be calculated. Additionally, p represents a parameter relating to the digital certificate $L_i$ and V represents the value of the parameter. W represents the weight given to a parameter. The weight can dictate which parameter is of higher importance when determining the rank of a digital certificate. The total number of parameters is represented as n. In some embodiments, the rank is calculated by one or more parameters (e.g., time of access, region, system used, application used, etc.) The rank can then be calculated once a parameter is selected. A high ranking can indicate a narrower, or stricter, policy. A lower ranking can indicate that a policy is relaxed. For example, in Equation 1, W weight can be set to 0, 1 or 2 (which can change from implementation to implementation). Zero weight can indicate that a parameter is not calculated and the policy is relaxed for that parameter. If a higher weight is given, then the rank can be higher indicating a strict policy resulting in a more secure digital certificate.

The certificate analyzer 120 is further configured to record any usage restriction policy violations performed by the digital certificate. For example, if a usage restriction within the usage restriction policy is a restriction for weekday usage only, then if the digital certificate is attempted to be used on a Saturday, then the certificate analyzer 120 can record that attempt/usage within an extension field. As such, a record is made whenever a digital certificate violates its usage restriction policy. This allows certification validations such as a certificate revocation list (CRL) or an online certificate status protocol (OCSP) can detect the usage restriction policy violations and take appropriate actions. These actions include, for example, rejection of a digital certificate, marking a digital certificate as compromised, alerting intrusion detection and prevention systems (IDPS), and the like.

The pattern detector 140 is a component of the certificate usage restriction system 100 configured to detect usage patterns of digital certificates from the parameters retrieved by the certificate analyzer 120. The pattern detector 140 can compile typical usage patterns of a digital certificate by analyzing the parameters to see how a user uses the digital certificate. For example, a user may typically use the digital certificate on weekdays, from a certain region, and during specific hours. If the pattern detector 140 determines that such a pattern exists, then it can combine those parameters into a usage pattern.

The usage patterns can be determined by having the pattern detector 140 analyze the parameters to detect which combinations of parameters a user uses. Once the pattern detector 140 determines a usage pattern, then it can store that usage pattern in the knowledge bank 130. Deviations from a usage pattern can be indicative of a misuse. As such, the certificate usage restriction system 100 applies usage restrictions to a digital certificate that reflect the usage patterns of the digital certificate.

The machine learning model 150 is a component of the certificate usage restriction system 100 configured to output a risk assessment for a digital certificate. The machine learning model 150 is a model that is trained using parameters and usage patterns converted to training data. The risk assessment output can be a scale that represents the potential misuse of a digital certificate by a user. For example, the risk assessment may indicate that a certain certificate authority originating from a particular location is indicative of a higher risk of misuse. Other factors or parameters, such as the time of day can also affect the risk assessment based on training of the machine learning model 150. The machine learning model 150 can be trained with a training dataset generated from the parameters and usage patterns. For example, the training samples can include parameters such as when the certificate is accessed, the region where the certificate is accessed over a period of time, the type of system used by a user when using the digital certificate, the application used by the user when using the digital certificate, and the like. The machine learning model 150 can be trained based on the predictability of scenarios occurring regarding a digital certificate. Any potential scenario outside of a typical use scenario can attribute to the overall risk. Additionally, a lack of knowledge regarding a digital certificate can also add to the risk. If the machine learning model 150 determines that a digital certificate is a risk and its usage restriction policy has been violated, then the certificate analyzer 120 can record the violation and risk in an extension field of the digital certificate.

The machine learning model 150 can employ various machine learning techniques in determining a usage restriction policy based on the parameters and patterns. Machine learning techniques can include algorithms or models that are generated by performing supervised training on a dataset and subsequently applying the generated algorithm or model to generate a risk assessment for a digital certificate. Machine learning algorithms can include but are not limited to decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), hidden Markov models, Gaussian naïve Bayes, multinomial naïve Bayes, averaged one-dependence estimators (AODE), Bayesian network (BN), classification and regression tree (CART), feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The usage restriction generator 160 is a component of the certificate usage restriction system 100 configured to generate usage restrictions for digital certificates. A usage restriction restricts the validity of a digital certificate. For example, a usage restriction can be that a digital certificate is only valid on weekdays. If a digital certificate has that restriction in place, then the digital certificate would be considered invalid if used on a Saturday or Sunday. Usage restrictions include, for example, days of the week restrictions, time period restrictions, invalidity periods or days, entity restrictions, restrictions based on entities, region restrictions, application restrictions, and the like. When a user shares a digital certificate with another entity, a usage restriction placed on the digital certificate can dictate the validity of that digital certificate. The validity can also be different on a per entity basis. For example, a digital certificate can be valid on a Monday for entity A, while the same digital certificate can be valid on a Thursday for entity B.

A usage restriction policy can be the compilation of usage restrictions for a digital certificate. The usage restriction policy can include at least one usage restriction to as many usage restrictions as needed. Additionally, the usage restriction generator 160 can change the usage restriction policy by altering the usage restrictions of a digital certificate when needed. The usage restriction policy need not be static and can dynamically change based on the risk of misuse of a digital certificate.

It is noted that FIG. 1 is intended to depict the major representative components of an exemplary certificate usage restriction system 100. In some embodiments, however, individual components may have greater or lesser complexity than as represented in FIG. 1, components other than or in addition to those shown in FIG. 1 may be present, and the number, type, and configuration of such components may vary.

Figure 2:
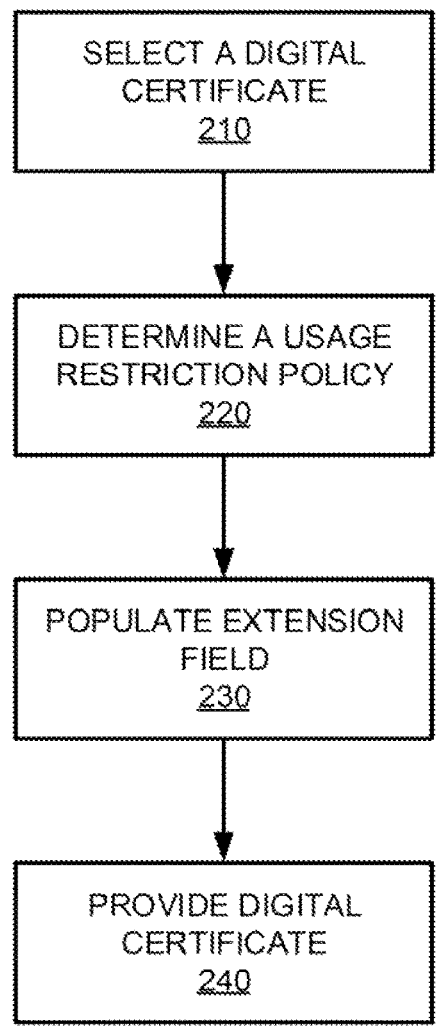
FIG. 2 is a flow diagram illustrating a process of assigning a usage restriction to a digital certificate, in accordance with embodiments of the present disclosure.

FIG. 2 is a flow diagram illustrating a process 200 of applying a usage restriction policy to a digital certificate, in accordance with embodiments of the present disclosure. The process 200 may be performed by hardware, firmware, software executing on a processor, or a combination thereof. For example, any or all the steps of the process 200 may be performed by one or more processors embedded in a computing device. The process 200 begins by selecting a digital certificate to apply a usage restriction policy. This is illustrated at step 210. For example, a company that provides digital certificates to its employees may select a digital certificate issued to one of its employees.

The usage restriction generator 160 determines a usage restriction policy for the digital certificate. This is illustrated at step 220. The usage restriction policy may be a predetermined policy. For example, a company may want to implement a usage restriction policy that only allows usage of digital certificates on the weekdays and between 9:00 a.m. and 5:00 p.m.

The usage restriction generator 160 may also determine the usage restriction policy based on parameters and usage patterns determined by the certificate analyzer 120 and the pattern detector 140. The certificate analyzer 120 can analyze a digital certificate and gather parameters based on the usage of the certificate by a user. For example, the certificate analyzer 120 can monitor a digital certificate to determine when the digital certificate, where it originated from, and by the type of system used by the user. The pattern detector 140 can compile typical usage patterns of a digital certificate by analyzing the parameters to see how a user uses the digital certificate. Once the parameters and the usage patterns are gathered and determined, the usage restriction generator 160 can generate usage restrictions based on that information. For example, if the usage patterns reflect that the digital certificate is used on Saturday and Sunday between the hours of 12:00 p.m. and 5:00 p.m., then the usage restriction generator 160 can generate usage restrictions that reflect the usage patterns of the digital certificate.

The usage restriction policy generated by the usage restriction generator 160 is populated in an extension field of the digital certificate. This is illustrated at step 230. Extension fields of a digital certificate are used to provide additional information about a certificate not provided in the other information fields. The other information includes, for example, key usage, alternative subject name, basic constraints, alternative serial number (e.g., bound serial number), policy constraints, and the like. In this instance, the information is the usage restriction policy. Similar to the validity field, when an entity receives the digital certificate, the entity can read the usage restriction policy to see if the digital certificate is valid or not. Once populated, the digital certificate is provided to the user for use. This is illustrated at step 240.

Figure 3:
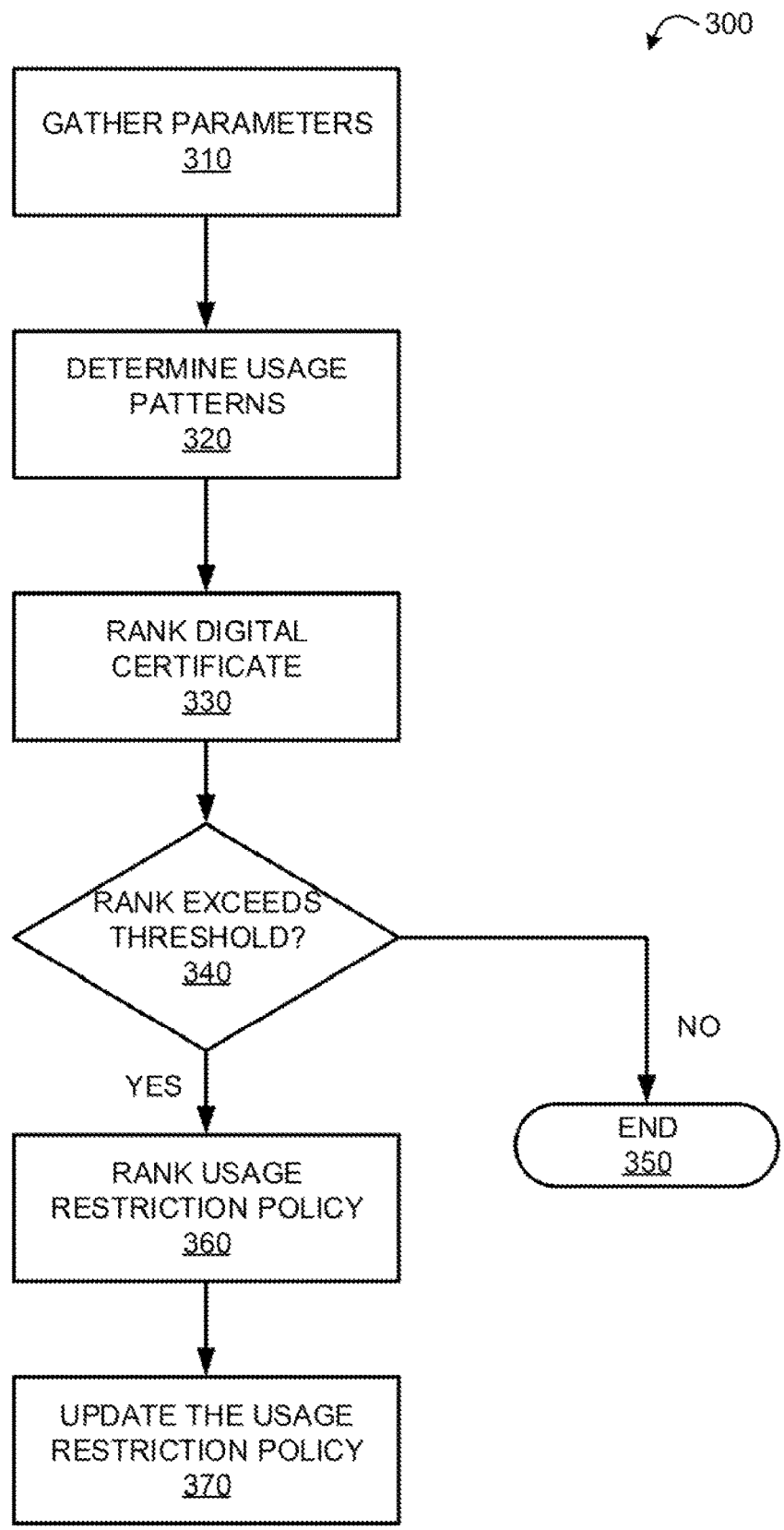
FIG. 3 is a flow diagram illustrating a process of updating a usage restriction policy based on a ranking, in accordance with embodiments of the present disclosure.

FIG. 3 is a flow diagram illustrating a process 300 of updating a usage restriction policy based on a ranking, in accordance with embodiments of the present disclosure. The process 300 may be performed by hardware, firmware, software executing on a processor, or a combination thereof. For example, any or all the steps of the process 300 may be performed by one or more processors embedded in a computing device.

The process 300 begins by the certificate analyzer 120 gathering parameters of a digital certificate with a usage restriction policy populated in its extension field. These parameters include, for example, the time when the certificate is accessed, such as the time of day, the particular days of the week, the particular days of the month, the particular days of the year, and the like. Additionally, the parameters can include the region where the digital certificate has been accessed over a period of time. For example, the region can be a specific city, state, province, country, and the like. Also, the parameters can include the type of system that a user uses to access the digital certificate. For example, an android device, an iOS device, a Linux machine, a Windows machine, and the like.

The pattern detector 140 determines usage patterns from the parameters gathered on the digital certificate. This is illustrated at step 320. The usage patterns can be a collection of parameters repeated over a period of time when the user uses the digital certificate. For example, a user may typically use the digital certificate on weekdays, from a certain region, and during specific hours. If the pattern detector 140 determines that such a pattern exists, then it can combine those parameters into a usage pattern.

The certificate analyzer 120 ranks the usage restriction policy of the digital certificate. This is illustrated at step 330. The rank can represent the effectiveness of the usage restriction policy and whether adjustments may be required. The ranking of the digital certificate can also be performed dynamically and at a regular interval to ensure that the digital certificate remains under a rank threshold.

The certificate analyzer 120 determines whether the rank of the digital certificate exceeds a predetermined threshold. This is illustrated at step 340. If the rank does not exceed a predetermined threshold, then the process 300 proceeds to step 350 and ends the process. However, if the rank exceeds the rank threshold, then the process 300 proceeds to step 360 and ranks the usage restriction policy of the digital certificate.

The certificate analyzer 120 determines the rank of the usage restriction policy. This is illustrated at step 360. Each usage restriction within the usage restriction policy can be ranked to determine which of the restrictions require adjustment. If a usage restriction exceeds a usage threshold, then that usage restriction can be marked as requiring adjustment. This repeats for every usage restriction in the usage restriction policy. In some embodiments, the ranking of the usage restriction policy is calculated using Equation 1 defined above.

The usage restriction generator 160 updates the usage restriction policy of the digital certificate. This is illustrated at step 370. The usage restriction generator 160 can change the usage restrictions based on the ranking of the usage restriction policy. Additionally, the usage restriction generator 160 can also redo the entire usage restriction policy by evaluating the parameters and the usage patterns.

Figure 4:
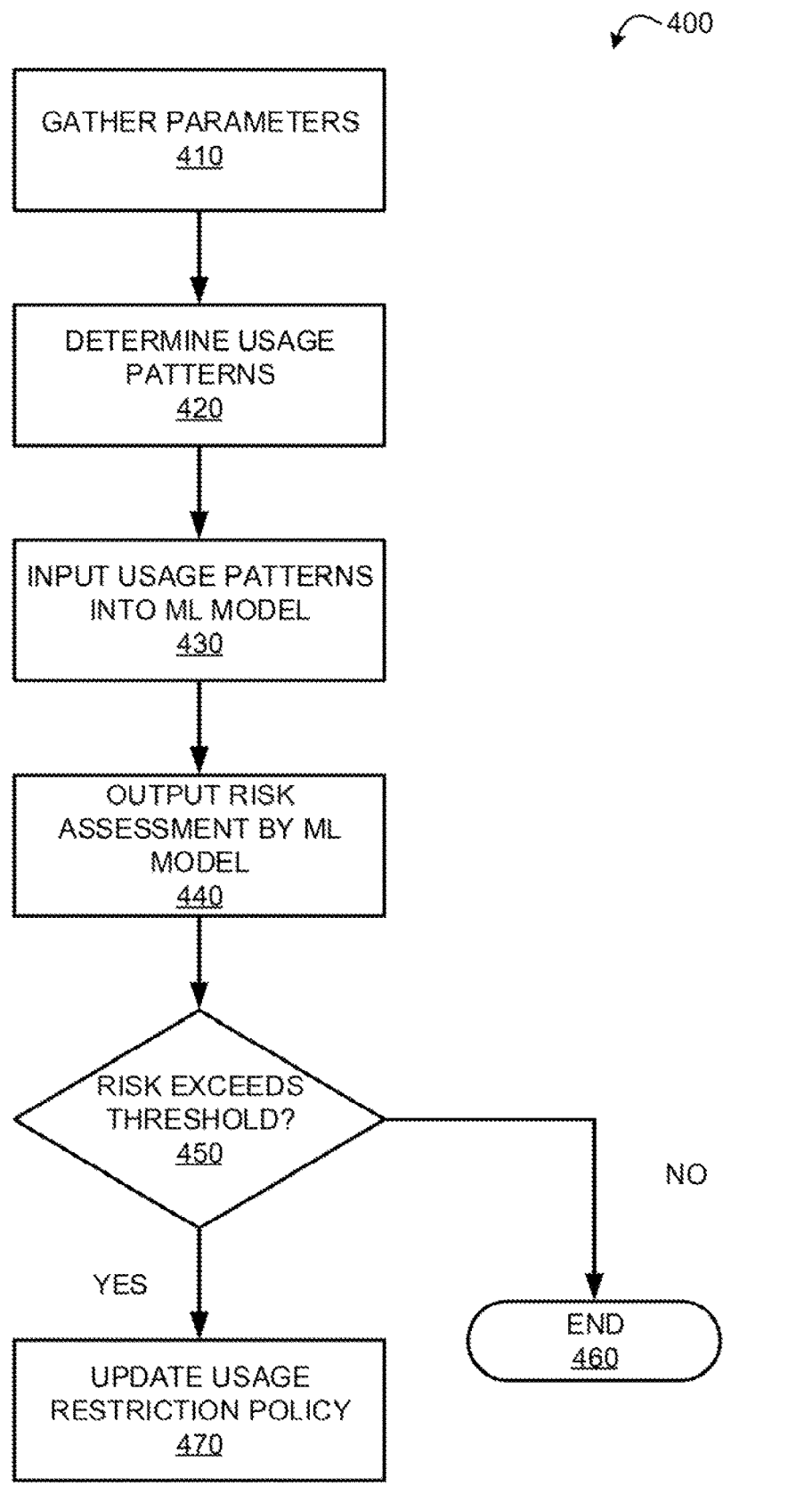
FIG. 4 is a block diagram illustrating a process of determining a risk assessment for a digital certificate, in accordance with embodiments of the present disclosure.

FIG. 4 is a flow diagram illustrating a process 400 of determining a risk assessment for a digital certificate, in accordance with embodiments of the present disclosure. The process 400 may be performed by hardware, firmware, software executing on a processor, or a combination thereof. For example, any or all the steps of the process 400 may be performed by one or more processors embedded in a computing device.

The process 400 begins by the certificate analyzer 120 gathering parameters of a digital certificate with a usage restriction policy populated in its extension field. These parameters include, for example, the time when the certificate is accessed such as the time of day, the particular days of the week, the particular days of the month, the particular days of the year, and the like. Additionally, the parameters can include the region where the digital certificate has been accessed over a period of time. For example, the region can be a specific city, state, province, country, and the like. Also, the parameters can include the type of system that a user uses to access the digital certificate. For example, an android device, an iOS device, a Linux machine, a Windows machine, and the like.

The pattern detector 140 determines usage patterns from the parameters gathered on the digital certificate. This is illustrated at step 420. The usage patterns can be a collection of parameters repeated over a period of time when the user uses the digital certificate. For example, a user may typically use the digital certificate on weekdays, from a certain region, and during specific hours. If the pattern detector 140 determines that such a pattern exists, then it can combine those parameters into a usage pattern.

The usage patterns are inputted into a machine learning model 150. This is illustrated at step 430. In some embodiments, the machine learning model 150 is a neural network continuously learning and outputting risk assessments of digital certificates based on usage patterns. The risk assessment can be a combination of potential risks relating to the digital certificate. These include, for example, usage patterns outside of the usage patterns determined by the pattern detector 140. These usage patterns may not be restricted by the usage restriction policy but can potentially be indicative of misuse. The machine learning model 150 is trained to analyze and weigh potential scenarios against scenarios that resulted in misuse of a digital certificate. Additionally, lack of knowledge regarding the digital certificate can potentially contribute to the overall risk of the digital certificate. Once completed, the machine learning model 150 outputs the risk assessment for the digital certificate. This is illustrated at step 440.

The certificate analyzer 120 determines whether the risk assessment of the digital certificate exceeds a risk threshold. This is illustrated at step 450. If the risk assessment does not exceed a risk threshold, then the process 400 proceeds to step 460 and ends the process. However, if the risk assessment exceeds a risk threshold (e.g., the risk assessment indicates a likelihood of misuse), then the process 400 proceeds to step 470.

The usage restriction generator 160 updates the usage restriction policy of the digital certificate. This is illustrated at step 470. The usage restriction generator 160 can change the usage restrictions based on the risk assessment by analyzes which usage restrictions to adjust or which usage restrictions can be added to the usage restriction policy. For example, if the risk assessment indicates a likelihood of misuse on a Saturday, then the usage restriction generator 160 can add a usage restriction excluding usage on Saturdays. Additionally, the usage restriction generator 160 can also redo the entire usage restriction policy by evaluating the parameters and the usage patterns.

Figure 5:
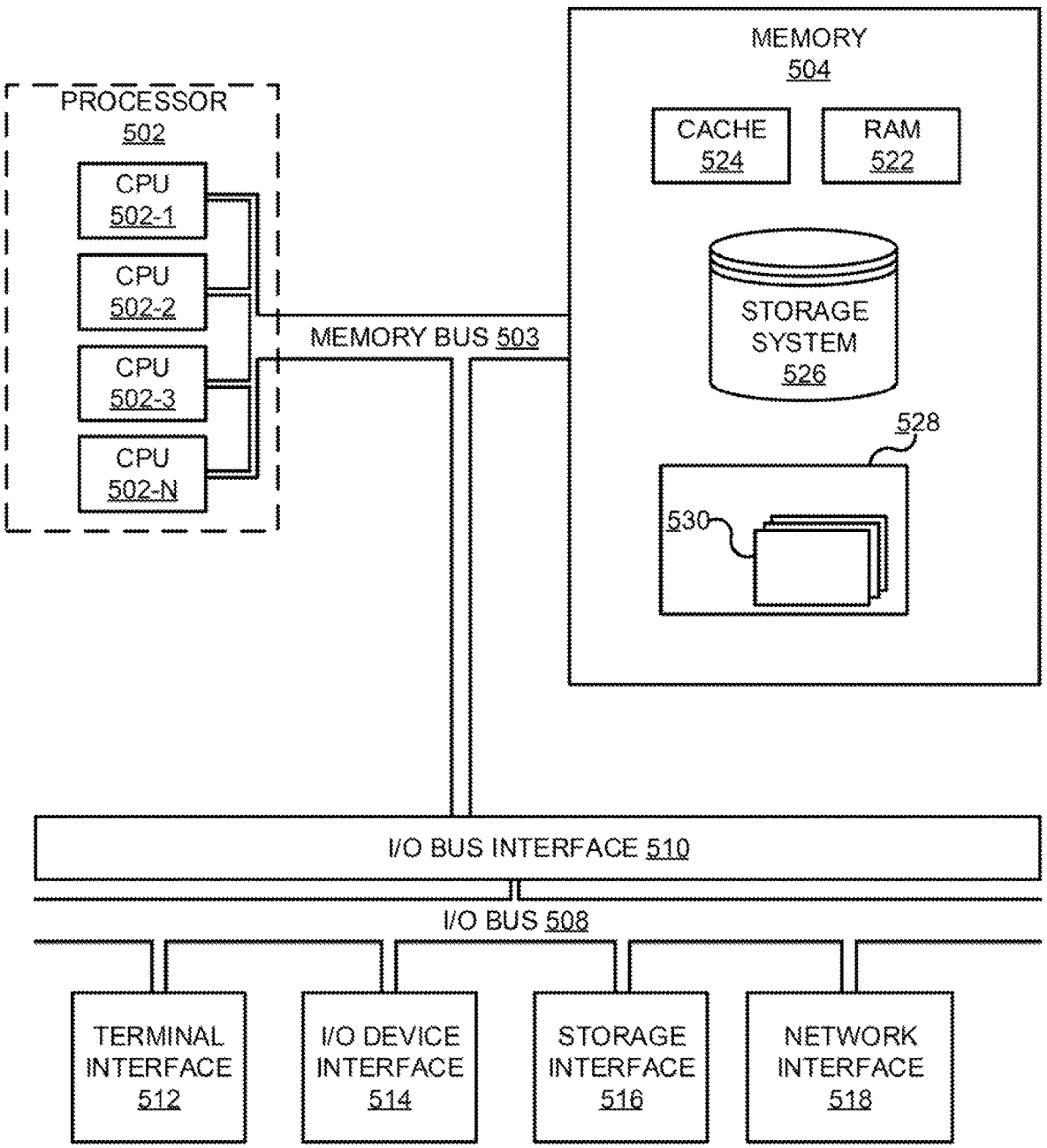
FIG. 5 is a high-level block diagram illustrating an example computer system that may be used in implementing one or more of the methods, tools, and modules, and any related functions, described herein, in accordance with embodiments of the present disclosure.

Referring now to FIG. 5, shown is a high-level block diagram of an example computer system 500 (e.g., the certificate usage restriction system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments, the computer system 500 may alternatively be a single CPU system. Each processor 502 may execute instructions stored in the memory 504 and may include one or more levels of onboard cache.

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 (e.g., the certificate usage restriction system 100), may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and P.D.A.s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
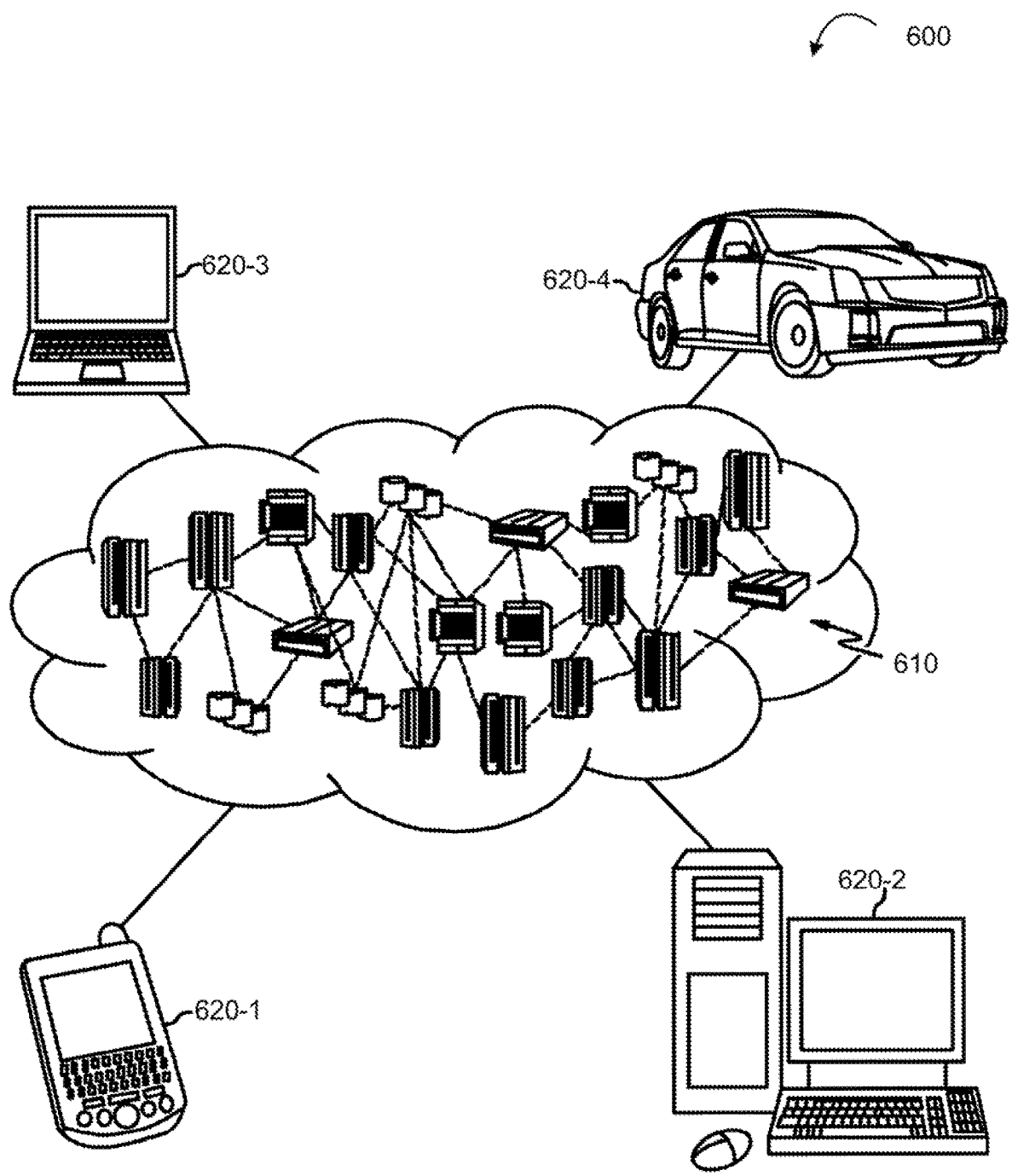
FIG. 6 depicts a cloud computing environment, in accordance with embodiments of the present disclosure.

Referring now to FIG. 6, illustrative cloud computing environment 600 is depicted. As shown, cloud computing environment 600 includes one or more cloud computing nodes 610 with which local computing devices used by cloud consumers, such as, for example, personal digital assistant (P.D.A.) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1 to 620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
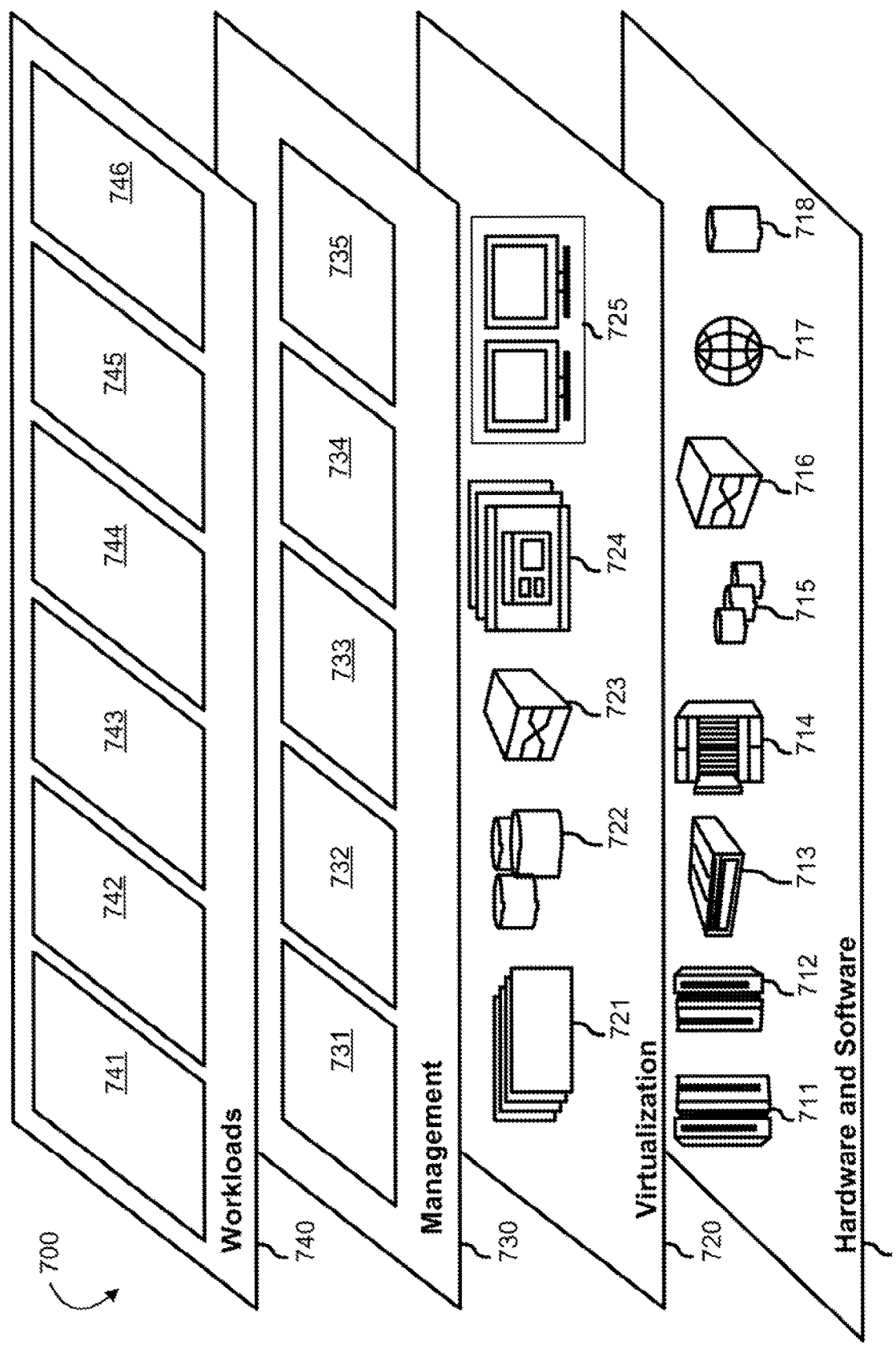
FIG. 7 depicts abstraction model layers, in accordance with embodiments of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 may provide the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (S.L.A.) planning and fulfillment 735 provide pre-arrangement for, and procurement of, cloud computing resources for which a future requirement is anticipated in accordance with an S.L.A.

Workloads layer 740 provides examples of functionality for which the cloud computing environment may be utilized. Examples of workloads and functions which may be provided from this layer include mapping and navigation 741; software development and lifecycle management 742 (e.g., the certificate usage restriction system 100); virtual classroom education delivery 743; data analytics processing 744; transaction processing 745; and precision cohort analytics 746.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:
1. A computer-implemented method comprising:
    selecting a digital certificate relating to a user;
    determining a usage restriction policy for the digital certificate based on the users;
    populating an extension field of the digital certificate with the usage restriction policy;

providing the digital certificate including the usage restriction policy to the user;

detecting a violation of the usage restriction policy; and recording the violation in another extension field of the digital certificate.

2. The computer-implemented method of claim 1, further comprising:

receiving, from an entity, a new usage restriction policy relating to the entity; and populating a second extension field of the digital certificate with the new usage restriction policy.

3. The computer-implemented method of claim 1, wherein the usage restriction policy restricts the digital certificate to a specific time period when the digital certificate is valid.

4. The computer-implemented method of claim 1, wherein the usage restriction policy restricts the digital certificate to specific days when the digital certificate is valid.

5. The computer-implemented method of claim 1, wherein the usage restriction policy restricts the digital certificate to specific entities the digital certificate is valid for.

6. The computer-implemented method of claim 1, wherein the usage restriction policy applies the usage restrictions on a per-entity basis.

7. The computer-implemented method of claim 1, wherein the usage restriction policy applies usage restrictions during a validity period of the digital certificate.

8. A computer program product comprising:

one or more computer readable storage media, and program instructions collectively stored on the one or more computer readable storage media, the program instructions comprising instructions configured to cause one or more processors to:

select a digital certificate relating to a user;

determine a usage restriction policy for the digital certificate based on the user;

populate an extension field of the digital certificate with the usage restriction policy; and provide the digital certificate including the usage restriction policy to the user;

detecting a violation of the usage restriction policy; and recording the violation in another extension field of the digital certificate.

9. The computer program product of claim 8, further comprising additional program instructions further configured to cause the one or more processors to:

receive, from an entity, a new usage restriction policy relating to the entity; and populate a second extension field of the digital certificate with the new usage restriction policy.

10. The computer program product of claim 8, wherein the usage restriction policy restricts the digital certificate to a specific time period when the digital certificate is valid.

11. The computer program product of claim 8, wherein the usage restriction policy restricts the digital certificate to specific days when the digital certificate is valid.

12. The computer program product of claim 8, wherein the usage restriction policy restricts the digital certificate to specific entities the digital certificate is valid for.

13. The computer program product of claim 8, wherein the usage restriction policy applies restrictions on a per-entity basis.

14. The computer program product of claim 8, wherein the usage restriction policy applies usage restrictions during a validity period of the digital certificate.

15. A system comprising:

one or more processors; and one or more computer-readable storage media storing program instructions, wherein the program instructions are configured to be executed by the one or more processors to cause the one or more processors to perform a method comprising:

selecting a digital certificate relating to a user;

determining a usage restriction policy for the digital certificate based on the user;

populating an extension field of the digital certificate with the usage restriction policy;

providing the digital certificate including the usage restriction policy to the user;

detecting a violation of the usage restriction policy; and recording the violation in another extension field of the digital certificate.

16. The system of claim 15, further comprising additional program instructions configured to cause the one or more processors to perform the method further comprising:

receiving, from an entity, a new usage restriction policy relating to the entity; and populating a second extension field of the digital certificate with the new usage restriction policy.

17. The system of claim 15, wherein the usage restriction policy restricts the digital certificate to a specific time period when the digital certificate is valid.

18. The system of claim 15, wherein the usage restriction policy restricts the digital certificate to specific days when the digital certificate is valid.

19. The system of claim 15, wherein the usage restriction policy restricts the digital certificate to specific entities the digital certificate is valid for.

20. The system of claim 15, wherein the usage restriction policy applies the usage restrictions on a per-entity basis.

* * * * *